(12) United States Patent
Clark-Heinrich

(10) Patent No.: US 12,448,084 B2
(45) Date of Patent: Oct. 21, 2025

(54) DRAIN PLUG FOR A BOAT

(71) Applicant: MasterCraft Boat Company, LLC, Vonore, TN (US)

(72) Inventor: Erica Clark-Heinrich, Knoxville, TN (US)

(73) Assignee: MasterCraft Boat Company, LLC, Vonore, TN (US)

( * ) Notice: Subject to any disclaimer, the term of this patent is extended or adjusted under 35 U.S.C. 154(b) by 475 days.

(21) Appl. No.: 18/087,051

(22) Filed: Dec. 22, 2022

(65) Prior Publication Data

US 2023/0192239 A1 Jun. 22, 2023

Related U.S. Application Data

(60) Provisional application No. 63/311,512, filed on Feb. 18, 2022, provisional application No. 63/292,924, filed on Dec. 22, 2021.

(51) Int. Cl.
*B63B 13/00* (2006.01)
*F16B 23/00* (2006.01)

(52) U.S. Cl.
CPC .......... *B63B 13/00* (2013.01); *F16B 23/0038* (2013.01)

(58) Field of Classification Search
CPC .. B63B 13/02; F16B 23/0007; F16B 23/0038; F16B 31/027; F16B 23/0092
See application file for complete search history.

(56) References Cited

U.S. PATENT DOCUMENTS

| | | | | |
|---|---|---|---|---|
| 3,413,949 A | * | 12/1968 | Lipton | B63B 13/00 114/184 |
| 5,171,117 A | * | 12/1992 | Seidl | B25B 15/005 411/404 |
| 5,647,712 A | | 7/1997 | Demirdogen et al. | |
| 5,765,980 A | * | 6/1998 | Sudo | F16B 23/0076 411/404 |
| 5,890,939 A | * | 4/1999 | Cotton | B63B 13/02 440/88 M |
| 6,112,694 A | * | 9/2000 | Burgos | B63B 13/00 114/364 |
| 6,357,376 B1 | | 3/2002 | Purio | |

(Continued)

FOREIGN PATENT DOCUMENTS

| | | | |
|---|---|---|---|
| DE | 3808534 A1 | * | 9/1989 |
| EP | 2912327 B1 | | 10/2013 |

(Continued)

*Primary Examiner* — Joseph W Sanderson
(74) *Attorney, Agent, or Firm* — Venable LLP

(57) ABSTRACT

A boat including a hull, a drain formed in the hull, and a plug engageable with the drain. The drain fluidly connecting a cavity formed in the hull to an exterior of the hull. The plug including threads engageable with threads of the drain. The plug is (i) moveable in a tightening direction to engage the threads of the plug with the threads of the drain and close the drain and (ii) moveable in a loosening direction to disengage the threads of the plug from the threads of the drain and open the drain. The plug also includes a handle having a receiver. The receiver having at least one disengaging surface configured to disengage a tool when the tool turns in the tightening direction and at least one engaging surface configured to allow the tool to loosen the plug when the tool turns in the loosening direction.

20 Claims, 7 Drawing Sheets

(56) References Cited

U.S. PATENT DOCUMENTS

| | | |
|---|---|---|
| 6,615,760 B1 * | 9/2003 | Wise ................... F16K 15/04 |
| | | 114/197 |
| 7,152,546 B2 | 12/2006 | Bernath |
| 7,191,723 B1 | 3/2007 | Bradford |
| 7,434,528 B1 | 10/2008 | McKibben |
| 7,699,012 B2 | 4/2010 | Cotten |
| 8,256,365 B2 | 9/2012 | Wise et al. |
| 8,549,962 B2 * | 10/2013 | Werner ................ B25B 15/005 |
| | | 81/460 |
| 8,690,504 B2 | 4/2014 | Huss, Jr. et al. |
| 9,303,539 B1 | 4/2016 | Peirce et al. |
| 9,486,900 B2 | 11/2016 | Werner et al. |
| 9,919,766 B2 * | 3/2018 | Daley ................... B63B 13/00 |
| 10,221,946 B1 * | 3/2019 | Pai ..................... F16B 23/0076 |
| 10,670,157 B2 | 6/2020 | Eberstadt, III et al. |
| 10,836,455 B2 | 11/2020 | Valverde et al. |
| 11,028,870 B2 * | 6/2021 | Tomaszewski ..... F16B 23/0092 |
| 11,173,589 B2 * | 11/2021 | Campbell, II ........ B25B 23/108 |
| 11,208,182 B2 | 12/2021 | Daley et al. |
| 11,225,303 B2 | 1/2022 | Daley et al. |
| 11,821,453 B2 * | 11/2023 | Chasse ............... F16B 23/0092 |
| 12,121,275 B2 * | 10/2024 | Destainville ........ F16B 23/0023 |
| 2009/0050043 A1 | 2/2009 | Alvarez |
| 2010/0263745 A1 * | 10/2010 | Symes ................ F16K 15/1823 |
| | | 137/528 |
| 2011/0259255 A1 * | 10/2011 | Pitts ....................... B63B 13/00 |
| | | 114/197 |
| 2011/0283843 A1 * | 11/2011 | Werner ............... F16B 23/0061 |
| | | 81/461 |
| 2017/0320545 A1 * | 11/2017 | Daley .................... B63B 13/00 |
| 2019/0003510 A1 * | 1/2019 | Chasse ............... F16B 23/0038 |
| 2019/0072179 A1 * | 3/2019 | Pai ........................ F16B 23/003 |
| 2019/0219089 A1 * | 7/2019 | Tomaszewski ..... F16B 23/0038 |
| 2020/0139523 A1 * | 5/2020 | Campbell, II ........ B25B 15/008 |
| 2020/0332821 A1 * | 10/2020 | Chasse ................ F16B 23/003 |
| 2021/0061417 A1 | 3/2021 | Valverde et al. |
| 2022/0307537 A1 * | 9/2022 | Garver ............... F16B 23/0038 |
| 2022/0313329 A1 * | 10/2022 | Destainville ....... A61B 17/8615 |

FOREIGN PATENT DOCUMENTS

| | | | | |
|---|---|---|---|---|
| EP | 3150867 A1 | * | 4/2017 | |
| GB | 1396518 A | * | 6/1975 | ......... F16B 23/0061 |
| KR | 20130004427 U | * | 7/2013 | |
| KR | 20140000604 U | * | 1/2014 | |
| KR | 20140056638 A | * | 5/2014 | |
| KR | 20140057772 A | * | 5/2014 | |
| WO | WO-2009120099 A1 | * | 10/2009 | ............ B63B 13/02 |
| WO | 2014/040238 A1 | | 3/2014 | |
| WO | 2020/236813 A1 | | 11/2020 | |
| WO | WO-2020227187 A1 | * | 11/2020 | ............ B63B 13/00 |

* cited by examiner

DRAIN PLUG FOR A BOAT

CROSS-REFERENCE TO RELATED APPLICATIONS

This application claims the benefit under 35 U.S.C. § 119 (e) of U.S. Provisional Patent Application No. 63/292,924, filed Dec. 22, 2021, and titled "USER FRIENDLY DRAIN PLUG," and U.S. Provisional Patent Application No. 63/311,512, filed Feb. 18, 2022, and titled "USER FRIENDLY DRAIN PLUG." The foregoing applications are incorporated herein by reference in their entireties.

FIELD OF THE INVENTION

The invention relates to replaceable drain plugs, particularly drain plugs used on watercraft, such as boats.

BACKGROUND OF THE INVENTION

Water may collect inside a boat and need to be drained from the boat. Such water may include bilge water that collects in the bilge of the boat. This water may be removed from the boat through a hole formed in the hull—a drain. The drain may be located in, for example, the lowest part of the transom. To prevent water from entering the boat through the drain, a removable drain plug may be inserted into the drain hole.

SUMMARY OF THE INVENTION

In one aspect, the invention relates to a boat including a hull, a drain, and a plug. The drain is positioned on the hull of the boat. The plug may seal the drain by, for example, being inserted into the drain such that water cannot pass through the drain, and the plug may be removed from the drain to allow water to pass through the drain from a cavity of the boat. The plug can be loosened and tightened by hand. A tool may be used to loosen the plug but not tighten it, and the plug includes features to engage with the tool and loosen the plug but not tighten it.

In another aspect, the invention relates to a boat including a hull having a cavity formed therein. A drain is formed in the hull and fluidly connects the cavity to an exterior of the hull. The drain includes threads, and a plug includes threads engageable with the threads of the drain. The plug is (i) moveable in a tightening direction to engage the threads of the plug with the threads of the drain and close the drain and (ii) moveable in a loosening direction to disengage the threads of the plug from the threads of the drain and open the drain. The plug also includes a handle, and the handle is operable to move the plug in the tightening direction and loosening direction. The handle includes a receiver positioned in the handle. The receiver is a bore having an opening, a bottom surface, four bearing surfaces forming a substantially square-shaped portion of the bore, and four ramps extending from each corner of the bottom surface to the opening in the tightening direction of the bore and upward in a radial direction of the bore.

In a further aspect, the invention relates to a boat including a hull having a cavity formed therein. A drain is formed in the hull and fluidly connects the cavity to an exterior of the hull. The drain includes threads, and a plug includes threads engageable with the threads of the drain. The plug is (i) moveable in a tightening direction to engage the threads of the plug with the threads of the drain and close the drain and (ii) moveable in a loosening direction to disengage the threads of the plug from the threads of the drain and open the drain. The handle is operable to move the plug in the tightening direction and loosening direction. The plug also includes a handle, and the handle includes a receiver positioned in the handle. The receiver is a bore having an opening, a non-circular bottom surface, at least one bearing surface, and at least one ramp. The bearing surface and the at least one ramp are positioned relative to each other within the handle such that, (i) when a tool is placed in the receiver and rotated in the loosening direction, the ramps direct the tool in a direction to abut the bearing surface and, after abutting the bearing surface, rotate the handle in the loosening direction and (ii) when a tool is placed in the receiver and rotated in the tightening direction, the ramps direct the tool in a direction to disengage the tool from the receiver.

In still another aspect, the invention relates to a boat including a hull having a cavity formed therein. A drain is formed in the hull and fluidly connects the cavity to an exterior of the hull. The drain includes threads, and a plug includes threads engageable with the threads of the drain. The plug is (i) moveable in a tightening direction to engage the threads of the plug with the threads of the drain and close the drain and (ii) moveable in a loosening direction to disengage the threads of the plug from the threads of the drain and open the drain. The plug also includes a handle, and the handle includes a receiver positioned in the handle. The receiver has at least one disengaging surface configured to disengage a tool when the tool turns in the tightening direction and at least one engaging surface configured to allow the tool to loosen the plug when the tool turns in the loosening direction.

These and other aspects of the invention will become apparent from the following disclosure.

BRIEF DESCRIPTION OF THE DRAWINGS

In FIG. 2, the drain plug is removed showing a drain.

In FIG. 3, the drain plug is installed in the drain.

DETAILED DESCRIPTION OF THE PREFERRED EMBODIMENTS

As noted above, a boat may be equipped with a drain to remove water that has accumulated in the boat, such as in the bilge, for example. This drain may be located, for example, in the transom of the boat and may be referred to as a transom drain. A drain plug may be used to close (plug) the drain. The drain may include female threads, and the plug may include male threads such that the plug can be screwed into the drain to close the drain, for example, when the boat will be operated in a body of water. When the boat is out of the body of water, the plug can be removed from the drain to allow water that collected within the boat to flow out of the drain. Conventional transom drain plugs can be difficult to remove, especially as a boat ages. If a drain plug becomes seized, it can be especially difficult to remove. The embodiments discussed herein include an integrated feature (removal feature) to help remove tight and seized drain plugs. This removal feature may be configured to assist only with removal and to prevent overtightening of the drain plug during insertion.

Figure 1:
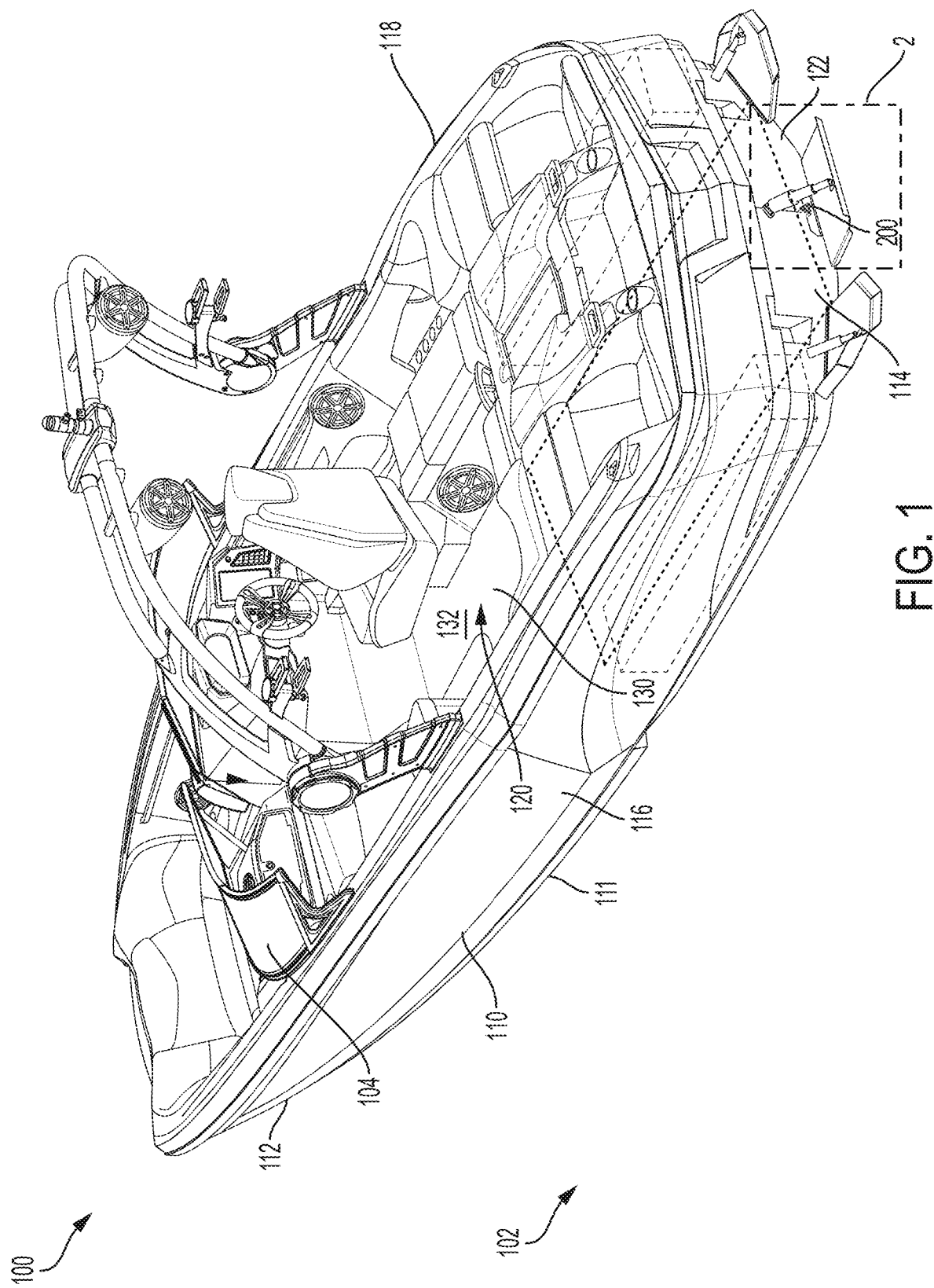
FIG. 1 shows a boat equipped with a drain plug in accordance with a preferred embodiment of the invention.

FIG. 1 shows a boat 100 equipped with a drain plug 200 in accordance with a preferred embodiment of the invention. The boat 100 shown in FIG. 1 is a recreational sport boat, and additional features of the recreational sport boat are shown and described in U.S. Patent Application Publication No. 2018/0314487, which is incorporated by reference herein in its entirety. In the embodiment shown in FIG. 1, the boat 100 is more specifically a bowrider. The boat 100 includes a hull 110 with a bow 112, a transom 114, a port side 116, and a starboard side 118. Collectively, the bow 112, the transom 114, and the port and starboard sides 116, 118 define an interior 120 of the boat 100. The boat 100 has a deck 130, which includes a floor 132. The hull 110 of the boat has a hull bottom 111, which is a bottom portion of the hull 110. Although the boat 100 shown is a bowrider, the drain plug 200 may be used with other types of boats, including cuddies, center consoles, cruisers, and bass boats, for example. The drain plug 200 may also be implemented in other types of watercraft. The invention is also not limited to boats with single decks but may also be used with other boats that have multiple decks, such as a flybridge.

A cavity 122 is formed within the interior 120 of the boat 100. As noted above, the cavity 122 may be a bilge or other compartment or portion of the interior 120 of the boat 100 that can collect fluids, such as water. The cavity 122 is fluidly connected to an exterior 102 of the hull 110 by a drain 202 (see FIG. 2), and the drain plug 200 is used to plug (close) the drain 202. The cavity 122 may be located between the floor 132 and the hull bottom 111 and adjacent to the drain 202. The exterior 102 of the hull 110 is the space outward from the hull 110. Although shown on the transom 114, the drain 202 and drain plug 200 may be located on other surfaces on the boat, including other surfaces of the hull 110.

Figure 2:
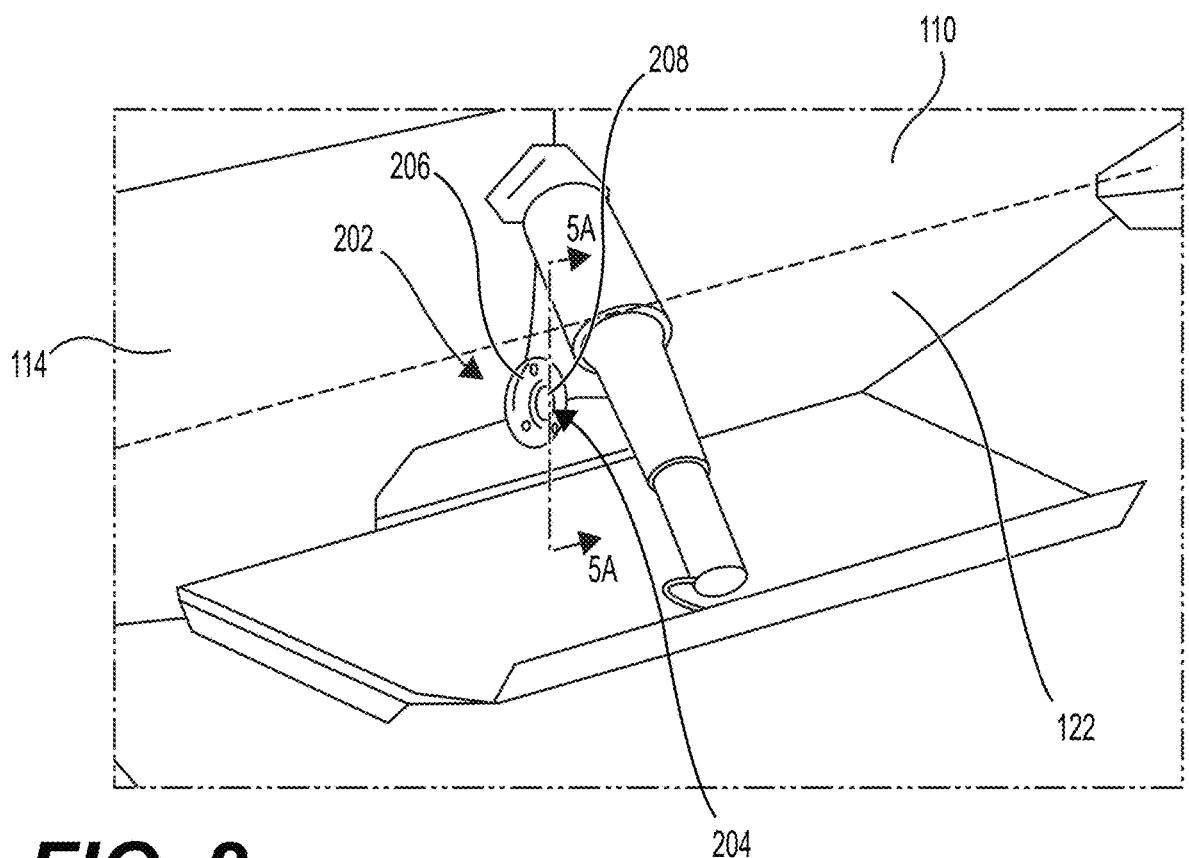
FIG. 2 is a detail view of part of the transom of the boat shown in FIG. 1, showing detail 2 in FIG. 1.
Figure 5A:
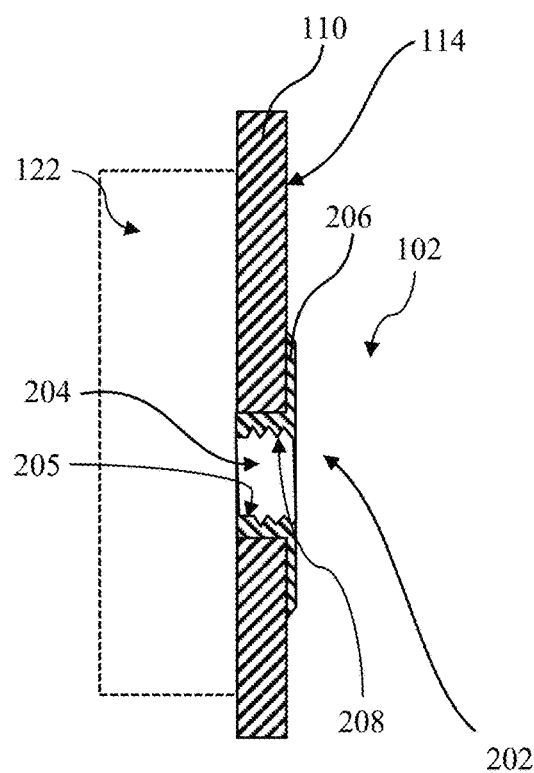
FIG. 5A is a cross-sectional view of the transom of the boat and drain, taken along line 5A-5A in FIG. 2.

FIG. 2 is a detail view of the transom 114 of the boat 100, showing detail 2 in FIG. 1, but with the drain plug 200 removed. FIG. 5A is a cross-sectional view of the transom 114 of the boat 100 and the drain 202, taken along line 5A-5A in FIG. 2. The drain 202 of this embodiment includes a through-hull hole 204 that allows water to drain from inside the hull 110 and, more specifically, the cavity 122, for example, the bilge, to the exterior 102 of the hull 110. As noted above, the through-hull hole 204 connects the cavity 122 to an exterior 102 of the hull 110 so that, for example, fluid (such as water) may travel out of the cavity 122 to the exterior 102 of the hull 110.

Figure 5B:
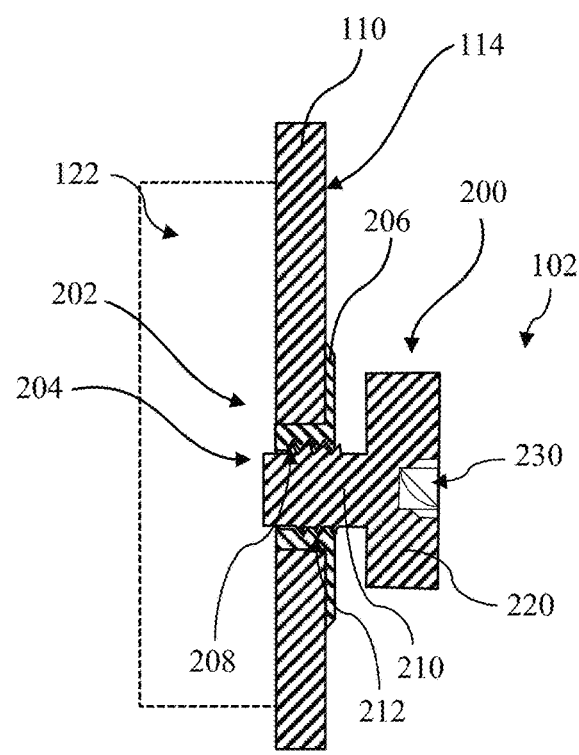
FIG. 5B is a cross-sectional view of the transom of the boat and the drain plug installed in the drain, taken along line 5B-5B in FIG. 3.

The drain 202 of this embodiment includes a fitting having a flange 206 to connect the fitting to the boat 100 and, more specifically, the transom 114. The flange 206 is annular and, as shown in FIG. 5B, includes female threads 208 formed on an inner surface 205 of the flange 206. In some embodiments, the female threads 208 can extend into the through-hull hole 204. A through-hull-hole direction of the drain 202 is the direction of movement directly through the hole of the drain 202. A diametrical direction of the drain 202 is a direction orthogonal to the through-hull-hole direction of the drain 202.

Figure 3:
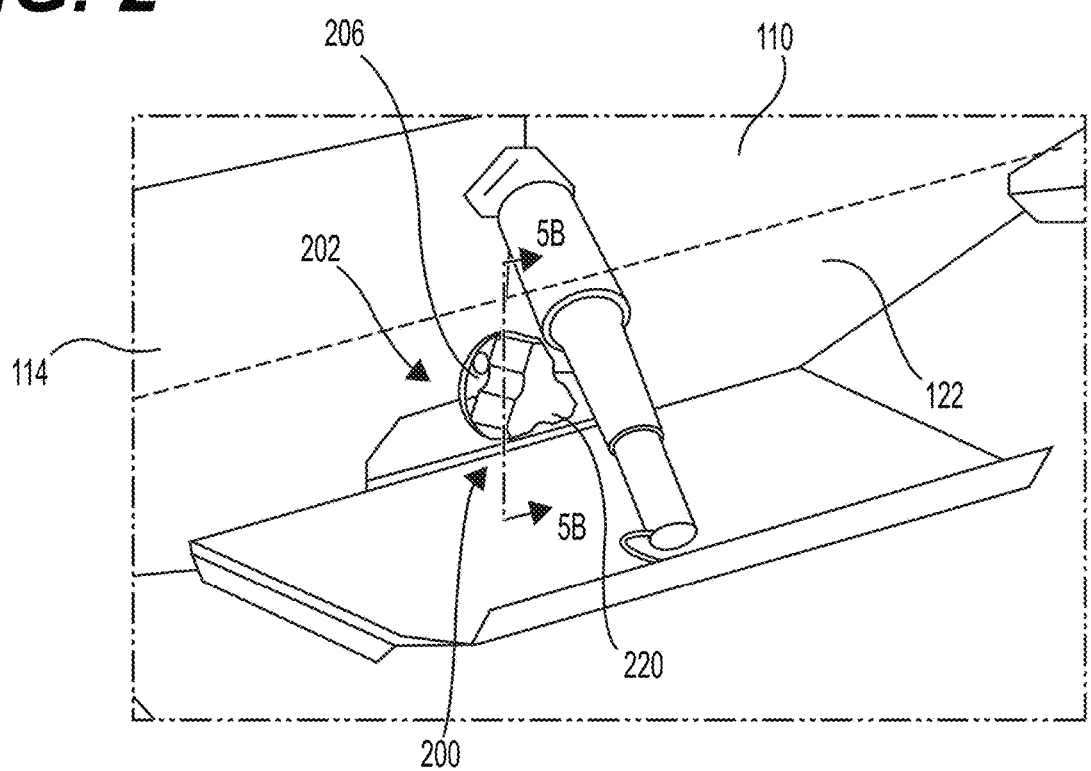
FIG. 3 is a detail view of the transom of the boat shown in FIG. 1, showing detail 2 in FIG. 1.
Figure 4:
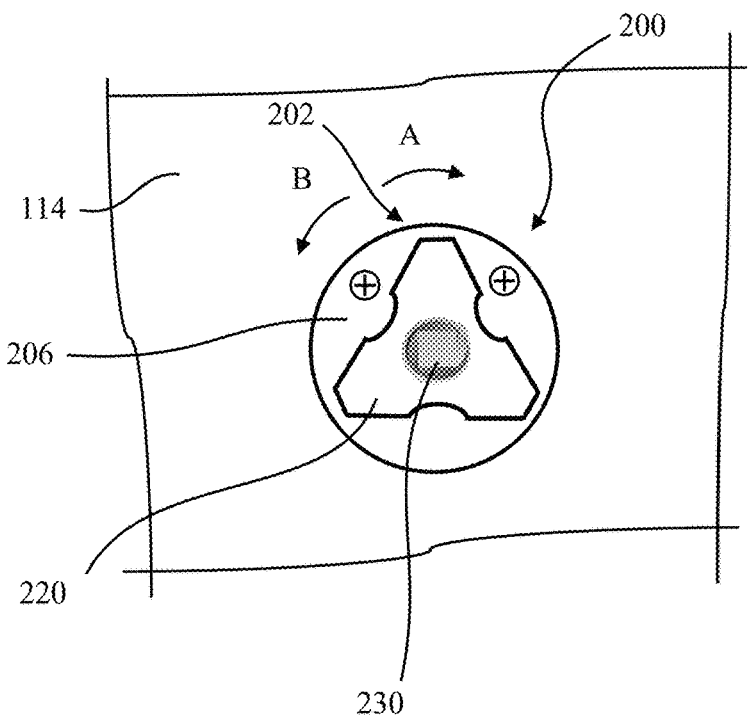
FIG. 4 is a view of the drain plug installed in the boat, looking forward from behind the transom.
Figure 6:
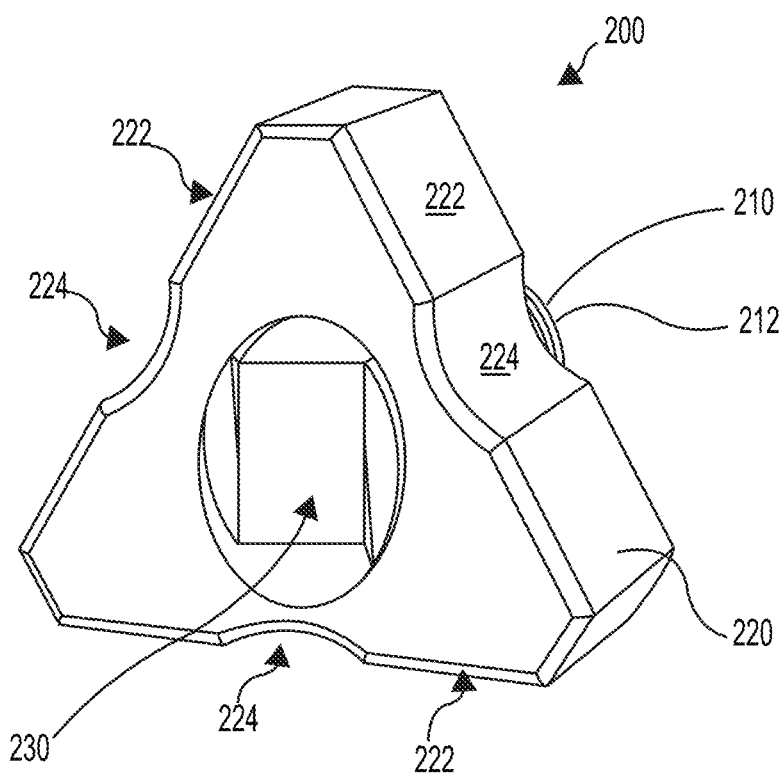
FIG. 6 is a perspective view of the drain plug shown in FIG. 3.

FIGS. 3, 4, and 5B show the drain plug 200 inserted in the drain 202 to plug or close the drain 202. FIG. 3 is a detail view of the transom 114 of the boat 100, showing detail 2 in FIG. 1, with the drain plug 200 installed. FIG. 4 shows the drain plug 200 from behind the transom 114, looking forward. FIG. 5B is a cross-sectional view of the transom 114 of the boat 100 and the drain plug 200, taken along line 5B-5B in FIG. 3. FIG. 6 is a perspective view of the drain plug 200, showing the drain plug 200 removed from the drain 202.

The drain plug 200 includes a shaft 210 provided with male threads 212 on the shaft 210. The male threads 212 engage with the female threads 208 inside the drain 202 and, more specifically in this embodiment, inside the through-hull hole 204. The drain plug 200 can be rotated in a tightening direction (direction A in FIG. 4) to engage the male threads 212 of the drain plug 200 with female threads 208 of the drain 202 and to close (or plug) the drain 202. More specifically, in this embodiment, the drain plug 200 plugs (closes) the drain 202 with the shaft 210 threaded into the through-hull hole 204 of the drain 202 to plug (or close) the through-hull hole 204, preventing fluid from flowing through the through-hull hole 204 between the cavity 122 and the exterior 102 of the hull 110. Rotating the drain plug 200 in a loosening direction (direction B in FIG. 4) disengages the male threads 212 and the female threads 208 from each other and allows the plug 200 to be removed from the drain 202 to open the drain. In other embodiments, a drain plug may include a shaft provided with female threads that may engage with male threads of a protruding drain, such as a drain with a shaft, so that the drain plug plugs the drain.

In certain embodiments, such as an embodiment shown in FIGS. 3, 4, 5B, and 6, the drain plug 200 includes a handle 220 that can be grasped by a user to screw the drain plug 200 into the drain 202. The handle 220 is ergonomically designed to be easily grasped by the user's hand. Preferably, the drain plug 200 can be screwed into the drain 202 no more than finger tight, that is, tightened by the user's hand without the use of tools. The handle 220 in FIGS. 3, 4, 5B, and 6, has a triangular outer shape, but other shapes that facilitate being grasped by a hand may be used. Other shapes of the handle 220 may include, for example, a polygonal shape (such as a square-shaped handle or a hexagonal-shaped handle) or a circular shape or an elliptical shape. The handle 220 may include outer surfaces 222. The outer surfaces 222 are arranged next to each other to create a shape when the outer surfaces 222 are in combination. For example, in certain embodiments, the outer surfaces 222 of the handle 220 may, in combination, create a triangular shape thereby forming a triangular-shaped handle. In other embodiments, the outer surfaces 222 of the handle 220 may, in combination, create polygonal shapes and/or other non-circular shapes. In other embodiments, the handle 220 may have only one outer surface 222 that forms an elliptical shape, such as an oval, or a circular shape.

The handle 220 may include various features beyond the shape that also help a user rotate the handle 220 and thus the drain plug 200. As can be seen in FIGS. 4 and 6, for example, each outer surfaces 222 includes a concave portion 224 sized to fit the fingers of a user and help the user grasp and rotate the handle 220. Another feature may include the size of the handle 220. The drain 202 and, more specifically the through-hull hole 204, has a diameter in a diametrical direction. The handle 220 is larger than the through-hull hole 204 and the shaft 210, allowing the user to impart a greater torque by hand on the drain plug 200. More specifically, the handle 220 may be sized such that a reference circle circumscribing the handle 220 and intersecting at least two outermost points of the handle has a diameter that is larger than the diameter of the drain 202 and, more specifically, the through-hull hole 204 and/or the shaft 210.

In the embodiments discussed herein, the threads (female threads 208 and male threads 212) are standard threads. As shown in FIG. 4, the drain plug 200 is tightened by rotating it in a clockwise direction, direction A (a first direction), and removed (loosened) by rotating it in a counter-clockwise direction, direction B (a second direction). Alternatively, the drain plug 200 may be equipped with other thread configurations, such as reverse threads, wherein the directionality of the features, including the ramps 240 (discussed below), is reversed.

The handle 220 enables the drain plug 200 to be removed from the drain 202 by a user without the use of tools, but, as noted above, the drain plug 200 can become very difficult to remove, particularly when the drain plug 200 sits in the drain 202 for a long time. As shown in FIGS. 4, 5B, and 6, the drain plug 200 and, more specifically in this embodiment, the handle 220, includes a removal feature. In this embodiment, the removal feature is a receiver 230 that is configured to receive a tool, such as a standard tool. A standard tool is a tool that may operate on multiple products of different technological fields and thus is not special to (not limited to) the drain plugs 200 discussed herein. In this embodiment, the tool used with the drain plug 200 is a ratchet driver 300 (see FIG. 7), and the receiver 230 is a drive socket that is configured to receive a drive tang 310 (see FIG. 7) of the ratchet driver 300. The receiver 230 may be integrally formed in the handle 220.

Figure 7:
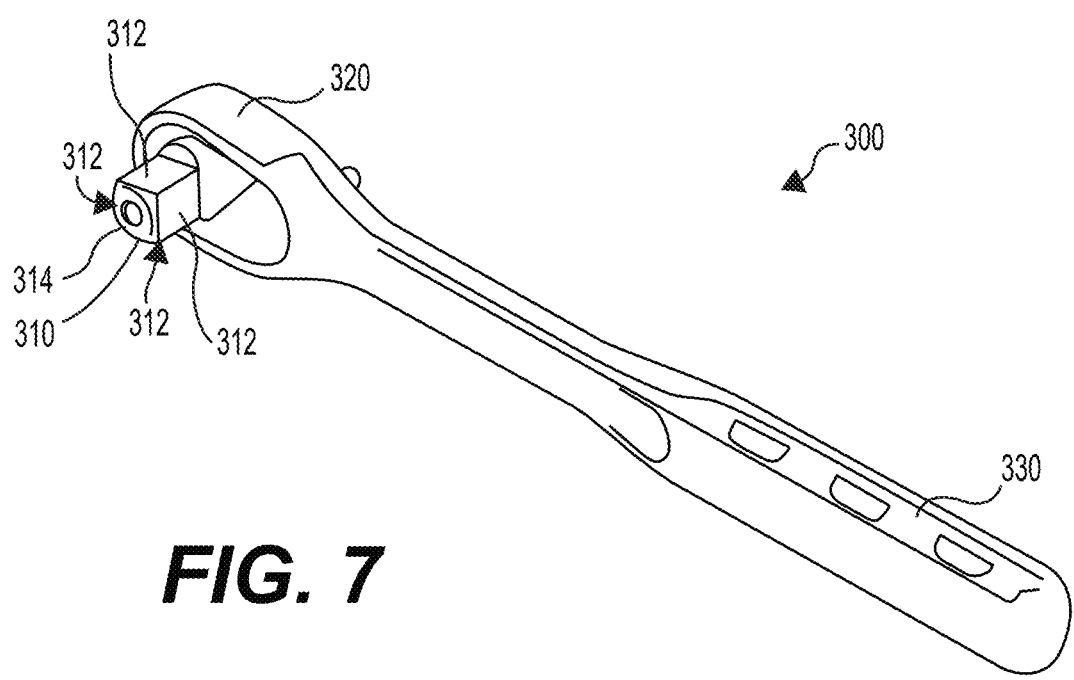
FIG. 7 is a perspective view of a tool that may be used with the drain plug shown in FIG. 1.

FIG. 7 is a perspective view of the ratchet driver 300. The drive tang 310 of the ratchet driver 300 may be any standard size, including, for example, ¼ inch, ⅜ inch, ½ inch, ¾ inch, 1 inch or even larger sizes. The drive tang 310 is square, having four side faces 312, and the drive tang 310 also includes a distal surface 314. The end of the drive tang 310 opposite the distal surface 314 is attached to a head 320 of the ratchet driver 300. The ratchet driver 300 also includes a handle 330 extending from the head 320 that can be used to rotate the ratchet driver 300, and more specifically, the drive tang 310.

Figure 8:
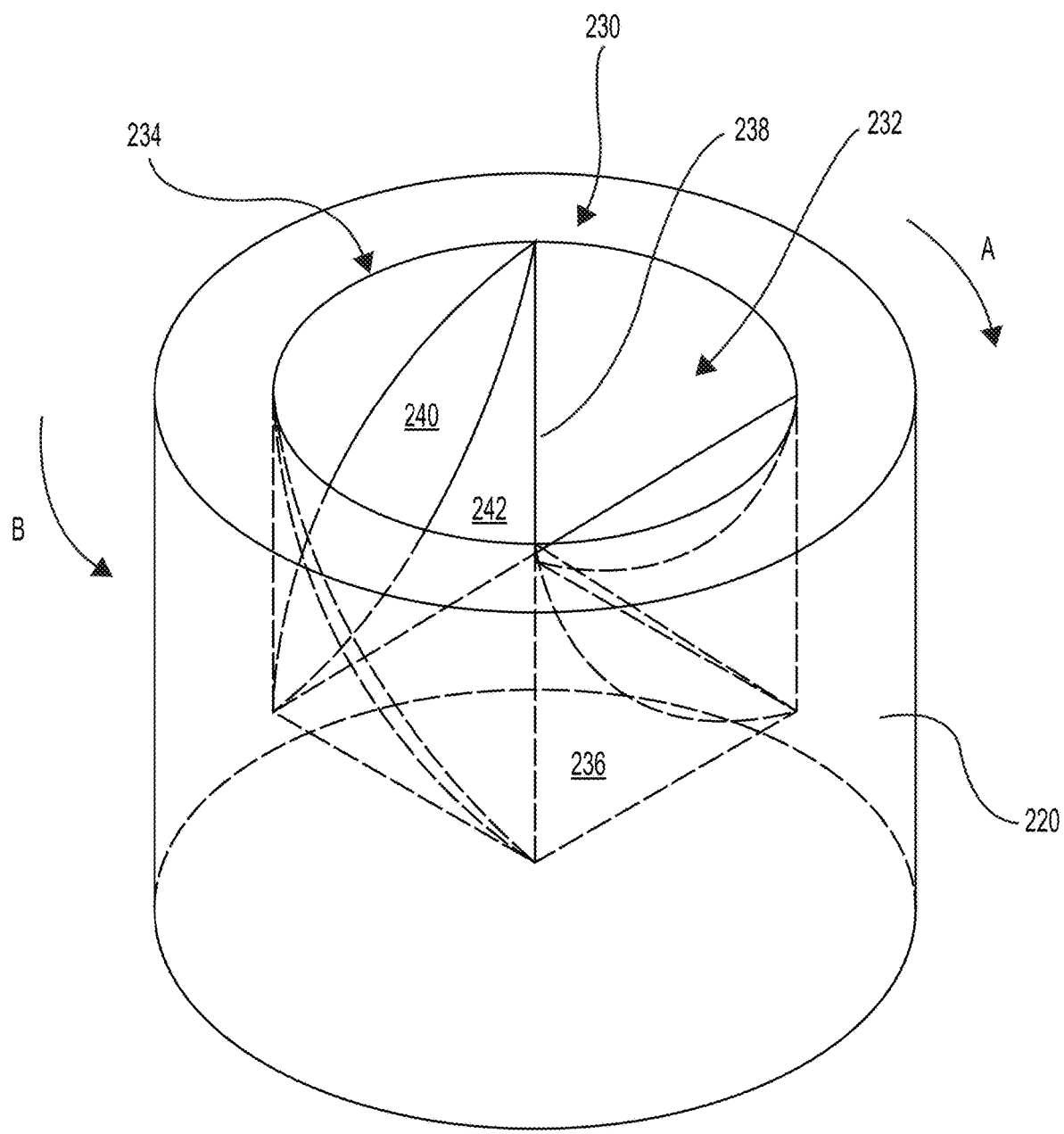
FIG. 8 is a perspective view of a handle and a receiver of a drain plug in accordance with a preferred embodiment of the invention.
Figure 9:
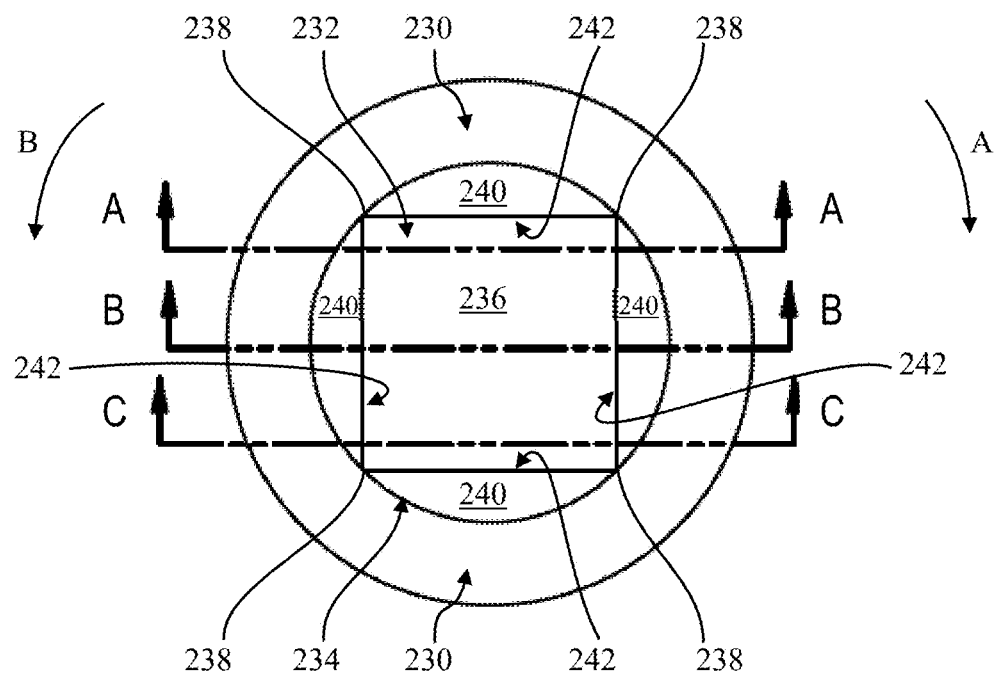
FIG. 9 is a top view of the handle and the receiver shown in FIG. 8.
Figure 10:
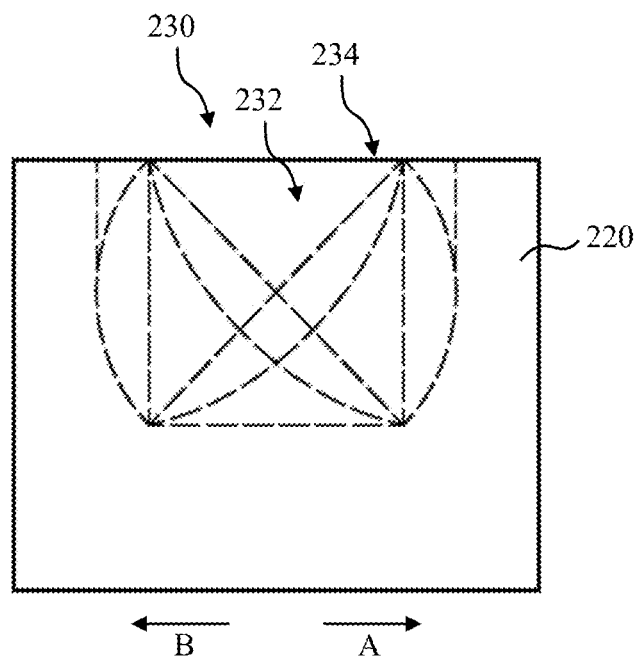
FIG. 10 is a side view of the handle and the receiver shown in FIG. 8.
Figure 11A:
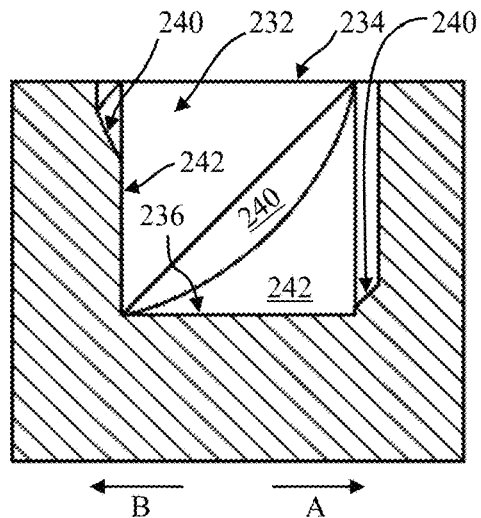
FIGS. 11A, 11B, and 11C are successive cross-sectional views of the handle and the receiver shown in FIG. 8, taken along line A-A, line B-B, and line C-C, respectively, in FIG. 9.
Figure 11B:
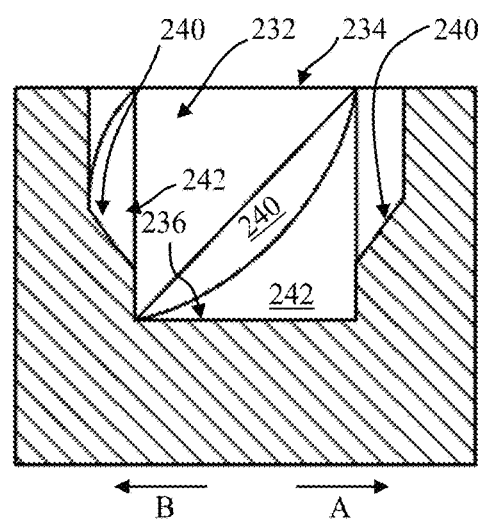
Figure 11C:
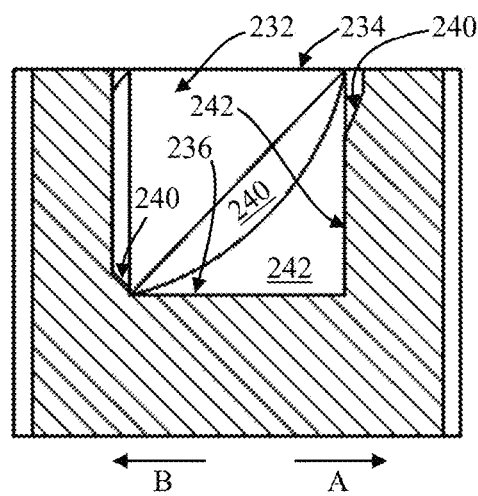

FIGS. 8, 9, 10, 11A, 11B, and 11C show the receiver 230 of the drain plug 200. FIG. 8 is a perspective view of a handle 220 of the drain plug 200 showing receiver 230. As noted above, the handle 220 may have any suitable shape, and the handle 220 shown in FIG. 8 is cylindrical with a circular shape. FIG. 9 is a top view of the handle 220, and the receiver 230 shown in FIG. 8 and FIG. 10 is a side view of the handle 220 and the receiver 230 shown in FIG. 8. FIGS. 11A, 11B, and 11C are successive cross-sectional views of the handle 220 and the receiver 230 taken along line A-A, line B-B, and line C-C, respectively, in FIG. 9.

The receiver 230 of this embodiment is a bore 232 formed in the handle 220. The bore 232 includes a circular opening 234 and a square bottom surface 236. Four bearing surfaces 242 are arranged to form a square-shaped portion of the bore 232. The bearing surfaces 242 are arranged and sized such that the receiver 230 and, more specifically, the bore 232 is configured to receive the drive tang 310 of the ratchet driver 300. The drive tang 310 is inserted into the bore 232, and when the ratchet driver 300 and, more specifically, the drive tang 310 is rotated in a direction to loosen the drain plug 200 (counter-clockwise in this embodiment), each side face 312 abuts a corresponding bearing surface 242 to transfer a rotational force to the drain plug 200 and rotate the drain plug 200 to remove it. The ratchet driver 300 can thus be used to help loosen and easily unscrew (remove) the drain plug 200.

To prevent overtightening, the receiver 230 is configured to prevent the ratchet driver 300 from being used to tighten the drain plug 200. Specifically, in this embodiment, the receiver 230 includes four ramps 240. Each ramp 240 is located on one side of the bore 232, above a corresponding bearing surface 242. A corner 238 (vertex) is formed by adjacent bearing surfaces 242, and each bearing surface 242 thus forms a side of a square-shaped portion of the bore 232. Each ramp 240 begins at a corner 238 and is angled upward from the bottom surface 236 to the opening 234. In this embodiment, each ramp 240 is angled upward in a clockwise direction (direction A) of the bore 232 and also upward in a radial direction of the bore 232. The portion of the bore 232 above each ramp 240 is arcuate between each corner 238 to form a cylinder between all four sides. The arcuate (or cylindrical) portion of the bore 232 is sized and configured to allow the drive tang 310 to rotate without imparting any rotational force, or without imparting substantial rotational force beyond friction with the ramps 240 or side walls, on the receiver 230 and thus the drain plug 200. Accordingly, the internal ramps 240 are configured such that if a user tries to use the ratchet driver 300 to tighten (rotate clockwise) the drain plug 200, the ramps 240 will drive the drive tang 310 out of the hole to prevent overtightening of the drain plug 200. Overtightening could result in too much torque being applied to the drain plug 200 thereby damaging or cracking the drain plug 200 or damaging the female threads 208 or other parts of the drain 202. In certain embodiments, a top surface of each ramp 240 may be called a disengaging surface, wherein the top surface of each ramp 240 is an inclined surface of each ramp 240. The drive tang 310 slides up the top surface of each ramp 240 as the ramps 240 drive the drive tang 310 out of the receiver 230 when the drive tang 310 turns in the tightening direction. In certain embodiments, a bearing surface 242 on which the drive tang 310 abuts to loosen the drain plug 200 may be called an engaging surface. The receiver 230 rotates in the loosening direction when the drive tang 310 of the ratchet driver 300 rotates in the loosening direction while abutting the engaging surface thereby loosening the plug 200 from the drain 202.

Although this invention has been described with respect to certain specific exemplary embodiments, many additional modifications and variations will be apparent to those skilled in the art in light of this disclosure. It is, therefore, to be understood that this invention may be practiced otherwise than as specifically described. Thus, the exemplary embodiments of the invention should be considered in all respects to be illustrative and not restrictive, and the scope of the invention to be determined by any claims supportable by this application and the equivalents thereof, rather than by the foregoing description.

What is claimed is:

1. A boat comprising:
a hull having a cavity formed therein;
a drain formed in the hull and fluidly connecting the cavity to an exterior of the hull, the drain including threads; and
a plug including:
  threads engageable with the threads of the drain, the plug being (i) moveable in a tightening direction to engage the threads of the plug with the threads of the drain and close the drain and (ii) moveable in a loosening direction to disengage the threads of the plug from the threads of the drain and open the drain; and
  a handle operable to move the plug in the tightening direction and loosening direction, the handle including a receiver positioned in the handle, the receiver being a bore having an opening, a bottom surface, four bearing surfaces forming a substantially square-shaped portion of the bore, and four ramps extending from each corner of the bottom surface to the opening in the tightening direction of the bore and upward in a radial direction of the bore.

2. The boat of claim 1, wherein the hull includes a transom and the drain is positioned in the transom.

3. The boat of claim 1, further comprising a floor, wherein the hull has a hull bottom and the cavity is positioned between the floor and the hull bottom.

4. The boat of claim 1, wherein the drain includes a through-hull hole, the through-hull hole fluidly connecting the cavity to the exterior of the hull, and
wherein the plug includes a shaft, the shaft being positioned within the through-hull hole to close the through-hull hole when the threads of the plug are engaged with the threads of the drain.

5. The boat of claim 4, wherein the drain includes a surface defining the through-hull hole, the threads of the drain being formed on the surface defining the through-hull hole, and
wherein the threads of the plug are formed on an exterior surface of the shaft.

6. The boat of claim 1, wherein the receiver is configured to receive a standard tool.

7. The boat of claim 6, wherein the standard tool is a ratchet driver, and the receiver is sized to receive one of the standard sizes of a drive tang of the ratchet driver.

8. The boat of claim 1, wherein the opening of the bore is circular.

9. The boat of claim 1, wherein each ramp has a top surface and the bore includes a plurality of arcuate sections, each arcuate section of the plurality of arcuate sections extending from above the top surface of one of the ramps to the opening of the bore, the arcuate sections together forming a cylindrical portion of the bore, the cylindrical portion having a diameter that is greater than or equal to a diagonal of the square-shaped portion of the bore.

10. A boat comprising:
a hull having a cavity formed therein;
a drain formed in the hull and fluidly connecting the cavity to an exterior of the hull, the drain including threads; and
a plug including:
  threads engageable with the threads of the drain, the plug being (i) moveable in a tightening direction to engage the threads of the plug with the threads of the drain and close the drain and (ii) moveable in a loosening direction to disengage the threads of the plug from the threads of the drain and open the drain; and
  a handle operable to move the plug in the tightening direction and loosening direction, the handle including a receiver positioned in the handle, the receiver being a bore having an opening, a non-circular bottom surface, at least one bearing surface, and at least one ramp, the bearing surface and the at least one ramp being positioned relative to each other within the handle such that, (i) when a tool is placed in the receiver and rotated in the loosening direction, the ramps direct the tool in a direction to abut the bearing surface and, after abutting the bearing surface, rotate the handle in the loosening direction and (ii) when a tool is placed in the receiver and rotated in the tightening direction, the ramps direct the tool in a direction to disengage the tool from the receiver.

11. The boat of claim 10, wherein the receiver includes four bearing surfaces forming a substantially square-shaped portion of the bore.

12. The boat of claim 11, wherein the tool is a ratchet driver including a tang, when the tang is inserted in the receiver and rotated in the loosening the tang abuts the bearing surfaces to rotate the handle.

13. The boat of claim 10, wherein the at least one ramp extends from a corner of the non-circular bottom surface to the opening in the tightening direction.

14. The boat of claim 13, wherein the at least one ramp extends upward in a direction from the non-circular bottom surface to the opening in a radial direction of the bore.

15. A boat comprising:
a hull having a cavity formed therein;
a drain formed in the hull and fluidly connecting the cavity to an exterior of the hull, the drain including threads; and
a plug including:
  threads engageable with the threads of the drain, the plug being (i) moveable in a tightening direction to engage the threads of the plug with the threads of the drain and close the drain and (ii) moveable in a loosening direction to disengage the threads of the plug from the threads of the drain and open the drain; and
  a handle including a receiver positioned in the handle, the receiver having at least one disengaging surface configured to disengage a tool when the tool turns in the tightening direction and at least one engaging surface configured to allow the tool to loosen the plug when the tool turns in the loosening direction.

16. The boat of claim 15, wherein the handle includes a plurality of outer surfaces that are arranged next to each other such that the outer surfaces in combination form a non-circular shape.

17. The boat of claim 16, wherein at least one outer surface includes a concave portion.

18. The boat of claim 16, wherein the outer surfaces in combination form a triangular shape.

19. The boat of claim 16, wherein the drain has a diameter in a diametrical direction, and
wherein the handle is sized such that a reference circle circumscribing the handle and intersecting at least two outermost points of the handle has a diameter that is larger than the diameter of the drain.

20. The boat of claim 15, wherein the receiver is a bore having an opening, a bottom surface, plurality of engaging surfaces, and a plurality of disengaging surfaces,
  wherein the plurality of engaging surfaces define a non-circular potion of the bore, and
  wherein each disengaging surface is a ramp extending upward in a direction from the bottom surface to the opening of the bore.

\* \* \* \* \*